US012671565B2

(12) United States Patent
Nagulapalli et al.

(10) Patent No.: US 12,671,565 B2
(45) Date of Patent: Jun. 30, 2026

(54) DIGITAL QUADRATURE CLOCK FOR LOW JITTER APPLICATIONS

(71) Applicant: ANALOG DEVICES, INC., Wilmington, MA (US)

(72) Inventors: Rajasekhar Nagulapalli, Northampton (GB); Narendra M.K. Rao, Alamo, CA (US)

(73) Assignee: Analog Devices, Inc., Wilmington, MA (US)

( * ) Notice: Subject to any disclaimer, the term of this patent is extended or adjusted under 35 U.S.C. 154(b) by 25 days.

(21) Appl. No.: 18/442,088

(22) Filed: Feb. 14, 2024

(65) Prior Publication Data

US 2024/0283630 A1     Aug. 22, 2024

Related U.S. Application Data

(60) Provisional application No. 63/446,296, filed on Feb. 16, 2023.

(51) Int. Cl.
H03K 5/15 (2006.01)
H04L 7/00 (2006.01)
(52) U.S. Cl.
CPC ................................. H04L 7/0016 (2013.01)
(58) Field of Classification Search
CPC ............................. H04L 7/0016; H03K 5/1504
See application file for complete search history.

(56) References Cited

U.S. PATENT DOCUMENTS

| | | | | |
|---|---|---|---|---|
| 10,536,151 B1* | 1/2020 | Zhou | ........................ | G06F 1/06 |
| 2017/0032125 A1* | 2/2017 | Lee | ........................ | G08B 21/18 |
| 2023/0087145 A1* | 3/2023 | Ye | ........................... | H04B 1/40 |
| | | | | 327/122 |
| 2023/0244266 A1* | 8/2023 | Ayya | .................. | H04L 27/3863 |
| | | | | 713/500 |

* cited by examiner

*Primary Examiner* — Sibin Chen

(74) *Attorney, Agent, or Firm* — Schwegman Lundberg & Woessner, P.A.

(57) ABSTRACT

Presented are systems and methods for generating quadrature clock signals for high-speed signal processing and similar applications. In various embodiments, a first input signal is rotated by a first phase angle to obtain a first rotated signal that represents a first quadrature clock signal. A second input signal that is 180 degrees out-of-phase with the first signal is rotated by a second phase angle such as to produce a second rotated signal. The unaltered first input signal and the phase-shifted second signal are then combined to derive an interpolated signal. This interpolated signal may be used to generate a second quadrature clock signal. As a result, the presented systems and methods effectively addresses the challenges of low-jitter, high-accuracy clock signal generation in applications such as SERDES and other systems that require precise timing signals, thereby ensuring enhanced system performance, while reducing complexity and power consumption.

16 Claims, 8 Drawing Sheets

100

200

300

400

600

700

800

DIGITAL QUADRATURE CLOCK FOR LOW JITTER APPLICATIONS

CROSS REFERENCE TO RELATED PATENT APPLICATIONS

The present application claims priority benefit, under 35 U.S.C. § 119(e), to commonly assigned U.S. Provisional Patent Application No. 63/446,296, filed on Feb. 16, 2023, entitled "DIGITAL QUADRATURE CLOCK FOR LOW JITTER APPLICATIONS," and listing as inventors Rajasekhar Nagulapalli and Narendra Rao, which application is herein incorporated by reference as to its entire content. Each reference mentioned in this patent document is incorporated by reference herein in its entirety.

BACKGROUND

A. Technical Field

The present disclosure relates generally to high-speed signal processing. More particularly, the present disclosure relates to quadrature clock generation systems and methods for low-jitter applications.

B. Background

Quadrature clock generation schemes are ubiquitous in all facets of high-speed clocking and more so in applications such as serializer deserializer (SERDES) and 4-way interleaved system applications. Two signals are typically generated from an input signal that has a sinusoidal or rectangular waveform. The resulting clock signals have a 90-degree phase shift, i.e., an in-phase clock and a quadrature phase clock. Today, three popular quadrature clock generation techniques exist: i) frequency-divider of modulus 2; ii) Quadrature voltage-controlled oscillator (VCO); and iii) Poly-phase filter (PPF) techniques. Of these, frequency-divider-based methods require a doubling of the input clock frequency, which is power consuming and, at times, impractical due to technological limitations. Quadrature VCO methods, on the other hand, require two similar VCOs that are injection-locked to each other. Such methods consume twice as much power, deliver sub-optimal phase noise results, and suffer from a major phase ambiguity. Finally, while PPF-based quadrature clock generation, due to its inherent passive nature, does not consume any additional power, it suffers from phase inaccuracies over process, voltage, and phase (PVT) variations, requiring square-wave-to-sine-wave conversion by filtering/slew rate reduction. This results in additional noise/jitter and circuit complexity.

Therefore, it is desirable to have systems and methods to overcome the disadvantages associated with existing approaches.

BRIEF DESCRIPTION OF THE DRA WINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
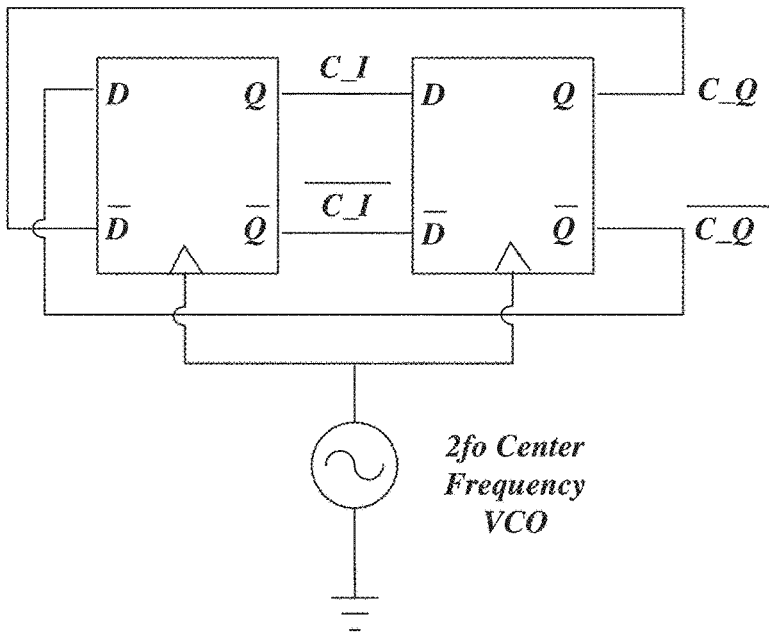
FIG. 1 depicts a widely-used frequency-divider-based quadrature clock generation system.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists that follow are examples and not meant to be limited to the listed items. Any headings used herein are for organizational purposes only and shall not be used to limit the scope of the description or the claims. Each reference mentioned in this patent document is incorporated by reference herein in its entirety.

Furthermore, it is noted that embodiments described herein are framed in the context of clock generation applications, but one skilled in the art shall recognize that the teachings of the present disclosure are not limited to such applications and may equally be used in other signal-processing applications and may be combined with any designs known in the art.

In this document, the terms "delayed," "phase-delayed," "phase-shifted," "rotated," and "shifted" may be used interchangeably. Similarly, depending on application and the technology (e.g., CMOS technology), the terms "vector," "clock," "clock signal" and "signal;" and the terms "inverter," "delay line," "flip-flop," and "buffer," may be used interchangeably.

FIG. 1 depicts a widely-used frequency-divider-based quadrature clock generation system. System 100 is known to have a reliably low phase error as long as the input clock supports a 50% duty cycle. In operation, system 100 utilizes a VCO to generate two clock frequencies that have a 90-degree phase shift, denoted in FIG. 1 as in-phase clock signal C_I and quadrature phase clock signal C_Q. To achieve a clock frequency of, e.g., 10 GHZ, an input clock frequency of 20 GHz must be generated and then divided down to the desired 10 GHz. However, this not only significantly increases the technical challenges associated with designing high-frequency VCO circuits for high-frequency applications, but also negatively impacts power consumption.

Figure 2:
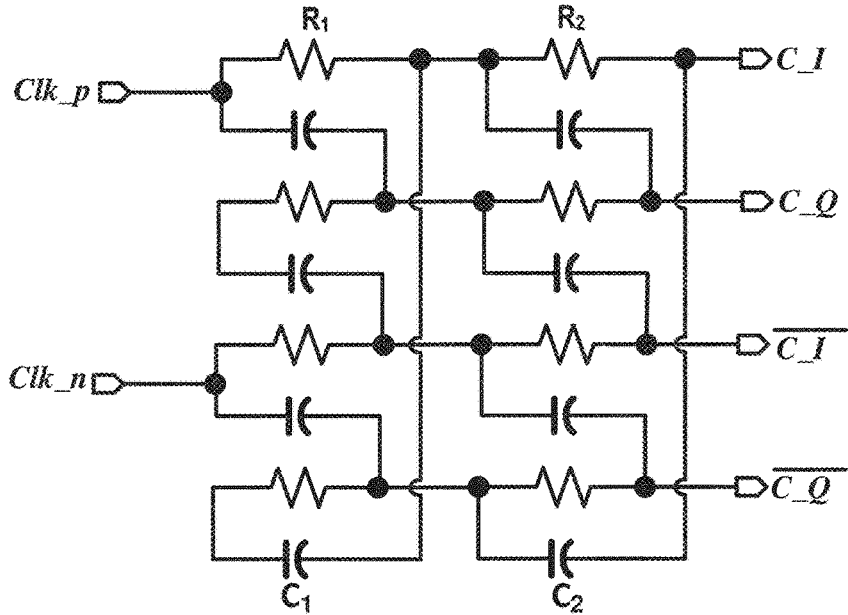
FIG. 2 depicts a conventional PPF-based quadrature clock generation system.

FIG. 2 depicts a conventional PPF-based quadrature clock generation system. As depicted, system 200 utilizes a two-stage RC filter to generate four clock signals, denoted as C_I, C_Q, and their respective complementary signals. Although the basic PPF design in in FIG. 2 does not require power-hungry circuitry to create a frequency that is twice as high as the output frequencies, inherent in the design is a significant phase error that is a function of the passive electric components. In addition, the resistive filter components introduce unwanted signal losses and generate significant noise, thereby, reducing the overall quality of the clock. This is further exacerbated in the presence of non-sinusoidal signals that exhibit higher-order harmonics. This inherent wave-shape dependency, thus, renders system 200 ill-suited for applications requiring, e.g., square clock signals and, unlike the frequency-divider-based quadrature clock generation system in FIG. 1 that can operate at a wide range of frequencies, limits system 200 generally to single-frequency clocks.

It is therefore desirable to have low-cost low-complexity systems and methods that avoid or eliminate the shortcomings of these existing approaches and to ensure high yield and system performance; ideally, without the need for special process control (device matching, additional masks, etc.), power, or additional calibration requirements.

Figure 3:
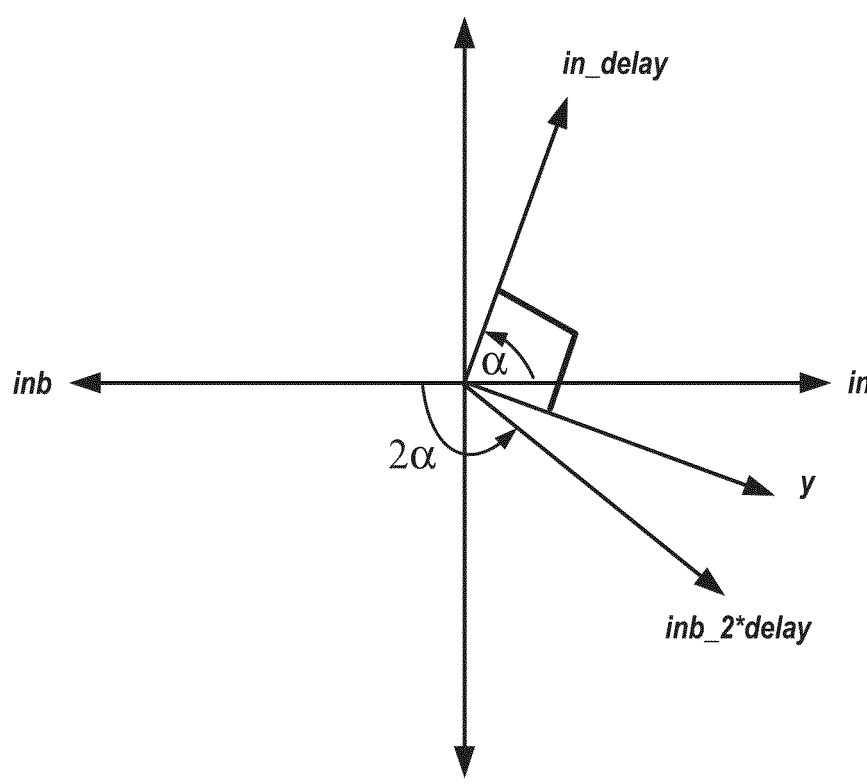
FIG. 3 is a vector diagram that illustrates quadrature signal generation according to various embodiments of the present disclosure.

FIG. 3 is a vector diagram that illustrates quadrature signal generation according to various embodiments of the present disclosure. It is noted that vector diagram 300, which illustrates how to generate quadrature signals from complementary input signals, is provided only to increase the understanding of the principles behind various embodiments presented herein and is not intended to limit the scope of the invention in any way. As depicted, vector diagram 300 comprises vector in, which represents a first clock signal; vector inb, which represents a second clock signal that is complementary to the first clock signal; vector in_delay, which represents a first delayed signal; vector inb_2*delay, which represents a second delayed signal; and y, which is an interpolated signal that, as discussed below, is created by combining the first clock signal and the second delayed signal. As can be gleaned from FIG. 3, this interpolated signal y forms an angle $\alpha$ with the first delayed signal in_delay. Similarly, vector inb_2*delay forms an angle $2a$ with the second clock signal inb.

As depicted in FIG. 3, signal in_delay may be generated with a delay or phase shift a in polar coordinates, which may be expressed as:

$$\text{in\_delay} = 1 \, \angle \, \alpha \tag{Eq. 1}$$

Similarly, in embodiments, by delaying complementary signal inb by two times the previously mentioned delay, implying a phase shift of $2a$, signal inb_2*delay may be generated. This may be expressed as:

$$\text{inb\_2} * \text{delay} = 1 \, \angle \, (\pi + 2\alpha) \tag{Eq. 2}$$

In embodiments, signals in and inb_2*delay may be interpolated such as to yield the resultant signal y. This may be expressed as:

$$y = 1 \, \angle \, (\pi/2 + \alpha) \tag{Eq. 3}$$

It is evident from vector or phasor diagram 300 and Eq. 1 and Eq. 3 that the signals in_delay and y are in quadrature.

It is noted that, in embodiments, phase shift a may assume any arbitrary value as it is not critical in determining the quadrature error from an accuracy (e.g., <20%) perspective. In embodiments, the delay may be chosen to be, e.g., close to one-fourth of the clock period, which advantageously obviates the need for power-hungry delay-locked loops (DLLs) and external quadrature correction loops.

Figure 4:
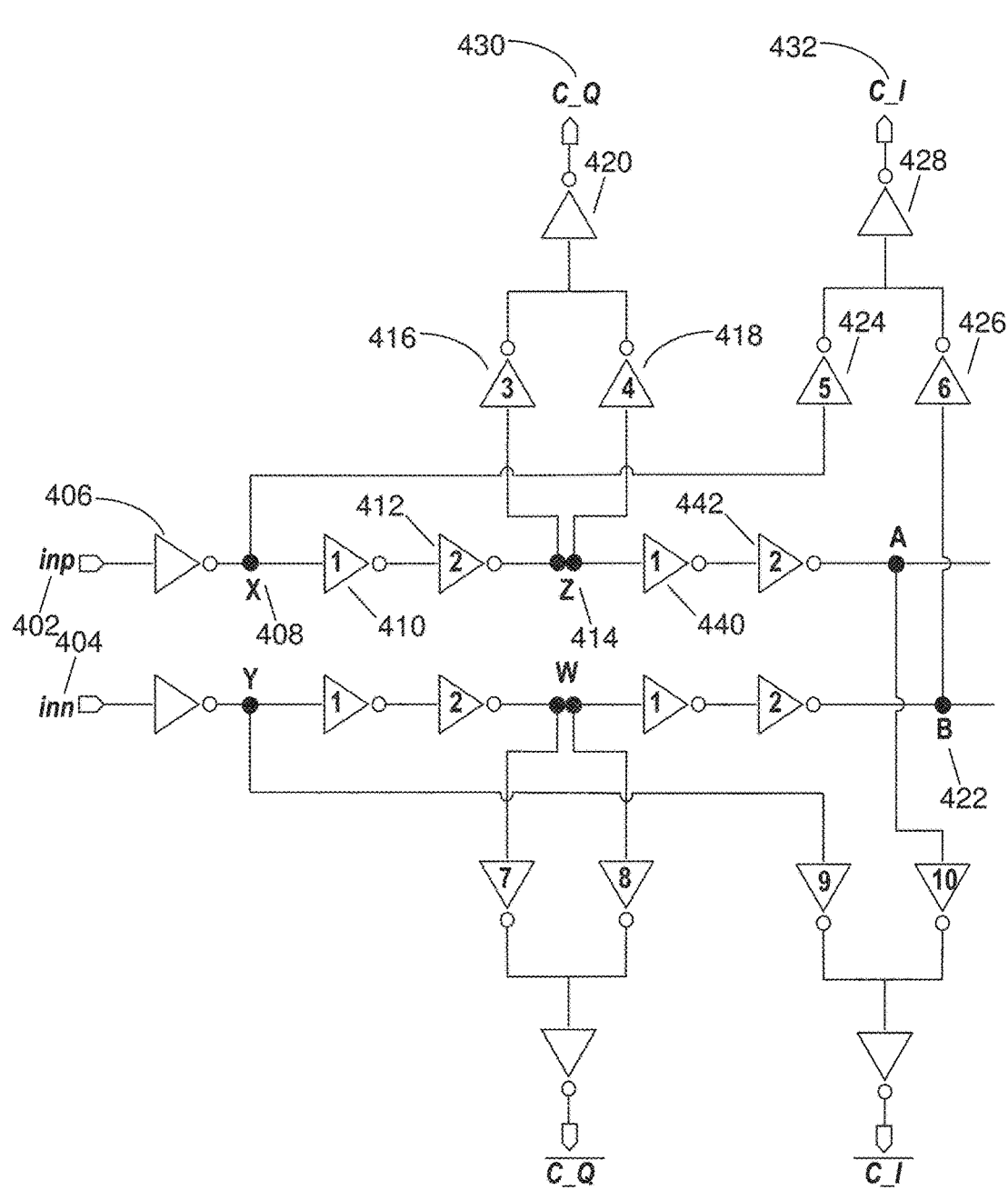
FIG. 4 is a simplified schematic of a quadrature generation system according to various embodiments of the present disclosure.

FIG. 4 is a simplified schematic of a quadrature generation system according to various embodiments of the present disclosure. In embodiments, system 400 may comprise input ports 402 and 404, input buffer 406, node 408 (denoted "X" in FIG. 4), inverters 410 and 412, 416 and 418, 424 and 426, 440 and 442, and in_delay node 414 (denoted "Z" in FIG. 4), output buffers 420 and 428, node 422 (denoted "B" in FIG. 4), and output ports 430 and 432. It is understood that system 400 may comprise additional and/or different electrical components, which may be combined in various configurations to achieve the objectives of the present disclosure. For example, in embodiments, any number of dummy inverters or loads may be added to equalize fanouts of appropriate gates, e.g., to drive the same amount of inverters or loads for a given path to achieve a comparable circuit performance. As depicted in FIG. 4, node 408 is augmented with such dummy inverter 406. For purposes of brevity, a description of the symmetrical circuit elements having similar functions is not repeated here. As another example, some inverters, e.g., inverter 416 and/or inverter 418, which increase circuit symmetry, may be omitted without the loss of generality.

In operation, input signals denoted inp and inn at respective input ports 402 and 404 are the complementary signals that may be generated, for example, by an LC VCO. In embodiments, any number of inverters or combinations thereof, e.g., cascaded inverters 410 and 412, may act as delay elements that cause a phase shift in input signal inp to generate a delayed signal at node 414. Similarly, cascaded inverters 440 and 442 may act as delay elements that cause an additional phase shift to the now delayed input signal to generate an even further delayed signal at node A. A person of skill in the art will understand that due to the symmetry of system 400, input signal inn may be similarly delayed at respective nodes W and B to generate a twice delayed signal at node 422.

In embodiments, inverters 424 and 426, or any other interpolation circuit, may be used to interpolate input signal 402 at node 408 and node B to generate in-phase clock signal (denoted "C_I" in FIG. 4) at output port 432, and inverters 416 and 418 may use the delayed signal at node 414 to generate a quadrature component (denoted "C_Q" in FIG. 4) of a clock signal at output port 430.

It is understood that an interpolation circuit may be implemented as an averaging circuit that generates the average of two signals. In embodiments, to minimize, e.g., a systemic delay, inverters 416 and 418 in the clock circuit that generates clock signal C_Q may be used to match the delay(s) of inverters 424 and 426 in the path of the clock circuit that generates C_I.

In embodiments, system 400 very elegantly generates a quadrature signal of a shifted signal by combining (e.g., averaging) the shifted signal with the signal's twice shifted complementary signal. In this manner, system 400 advantageously provides a low-cost, low-complexity solution that circumvents the shortcomings of the previously mentioned existing frequency-divider, quadrature VCO, and PPF approaches.

Further, in practice, basic interpolation circuits (i.e., low-complexity averaging circuits that average signals having different phase) operate better for certain phase angles, e.g., about 90 degrees. As a person of skill in the art will appreciate, near zero phase angles representing mathematical singularities should thus be avoided. In embodiments, to take advantage of such low-complexity averaging circuits, the phase angle that creates the shift is chosen in a range between, e.g., 45 and 135 degrees, such as to accommodate the capabilities of relatively low-cost, low-complexity averaging circuits. It is noted that similar constraints may be imposed, for example, to ensure system accuracy and without deviating from the scope of the invention.

It is understood that system 400 illustrated in FIG. 4 is not limited to the constructional detail shown there or described in the accompanying text. As those skilled in the art will appreciate, for example, suitable inverter circuits may be implemented as any delay, flip-flop, or buffer circuits known in the art. Advantageously, various embodiments herein, when compared to existing designs, occupy a relatively small amount of die area and consume less power, while simultaneously obviating any special requirements, such as double frequency generators, the need for dividers, additional VCOs, or calibration circuitry.

Figure 5A:
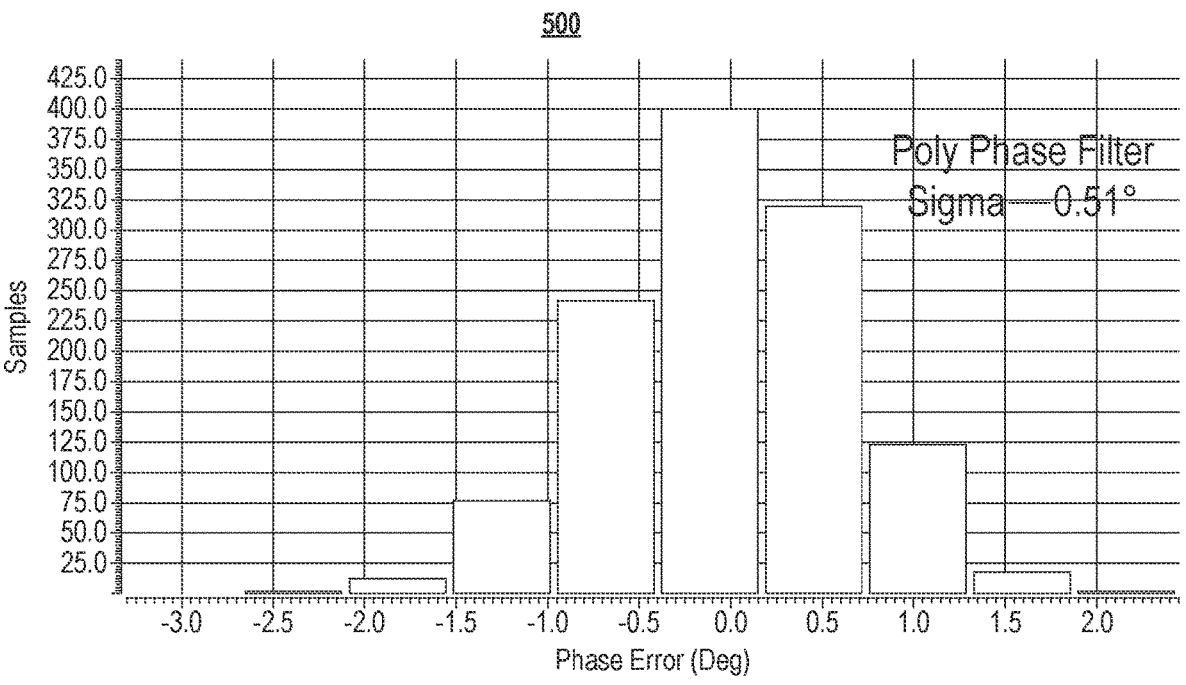
FIG. 5A depicts simulation results for phase error between quadrature phases across PVT for a conventional PPF approach.
Figure 5B:
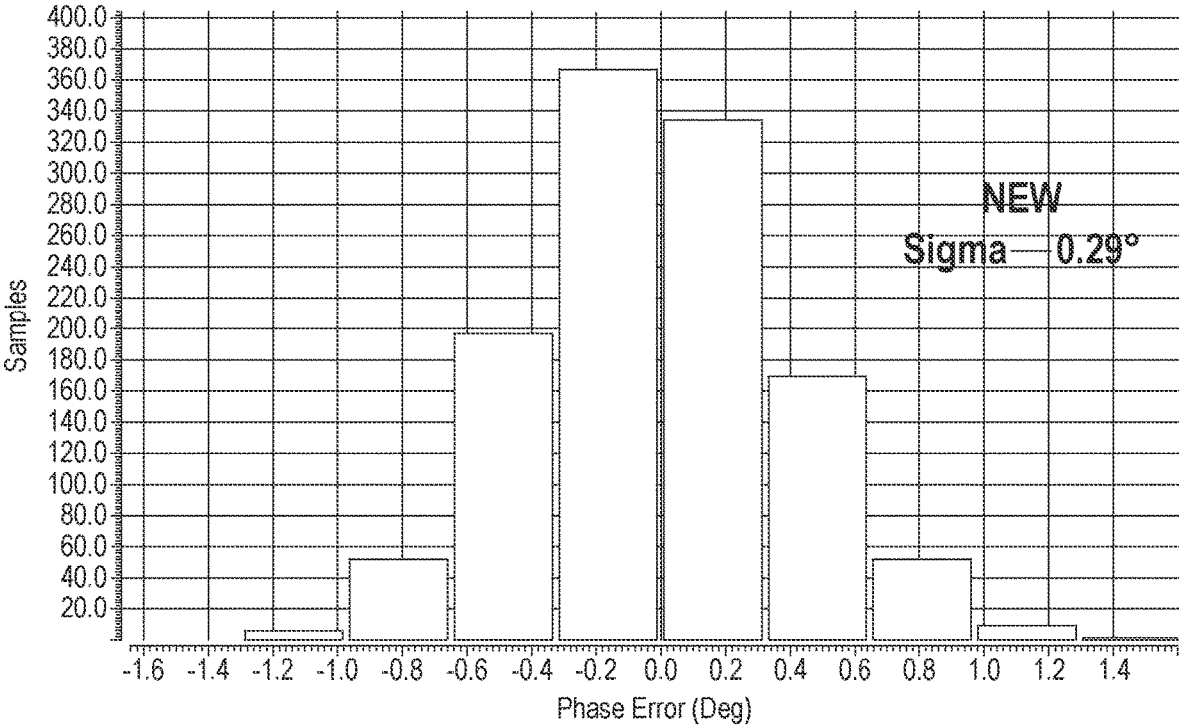
FIG. 5B depicts simulation results for phase error between quadrature phases across PVT according to various embodiments of the present disclosure.
Figure 6:
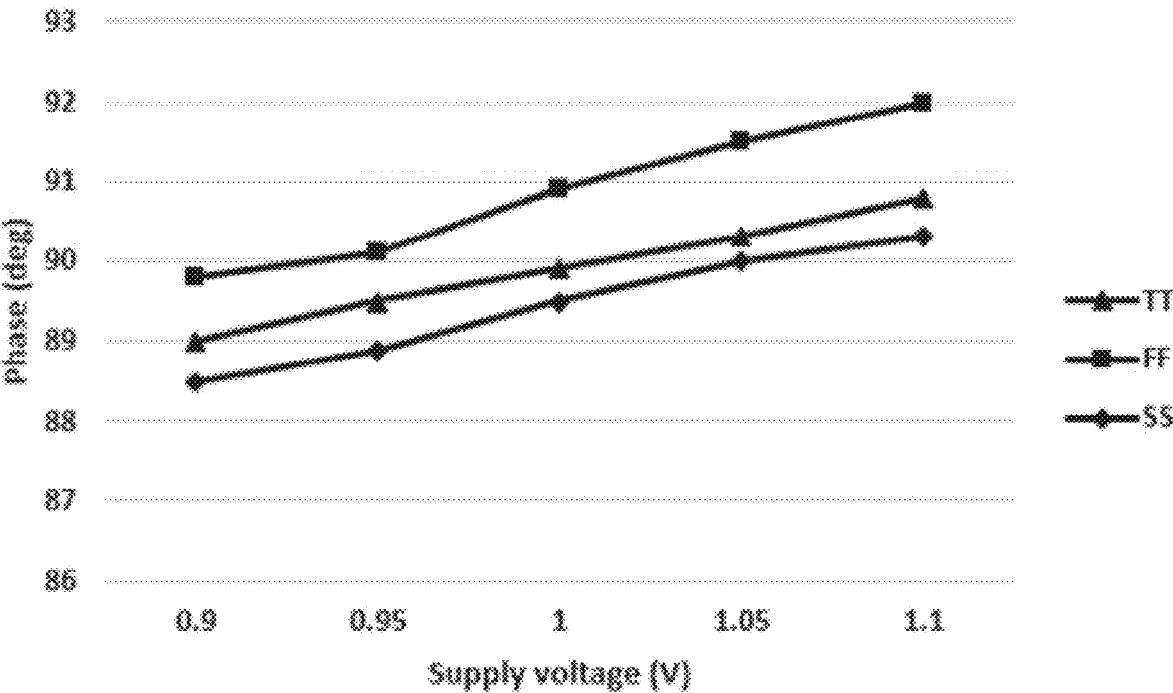
FIG. 6 depicts PVT-induced phase deviations for a quadrature generation system according to various embodiments of the present disclosure.

FIG. 5A depicts simulation results for phase error between quadrature phases across PVT for a conventional PPF approach. As shown, the standard deviation of the phase error is 0.51 degrees. FIG. 5B depicts simulation results for phase error between quadrature phases across PVT according to various embodiments of the present disclosure. As shown, the standard deviation of the phase error is 0.29 degrees. Similarly, FIG. 6 depicts PVT-induced phase deviations for a quadrature generation system according to various embodiments of the present disclosure. Phase deviations for various conditions: typical (denoted as "TT"); fast typical (denoted as "FF"); and slow typical (denoted as "SS") for different power supply voltages are shown. It is noted that experiments and results herein are provided by way of illustration and were performed under specific conditions using a specific embodiment or embodiments; accordingly, neither these experiments nor their results shall be used to limit the scope of the disclosure of the current patent document.

Figure 7:
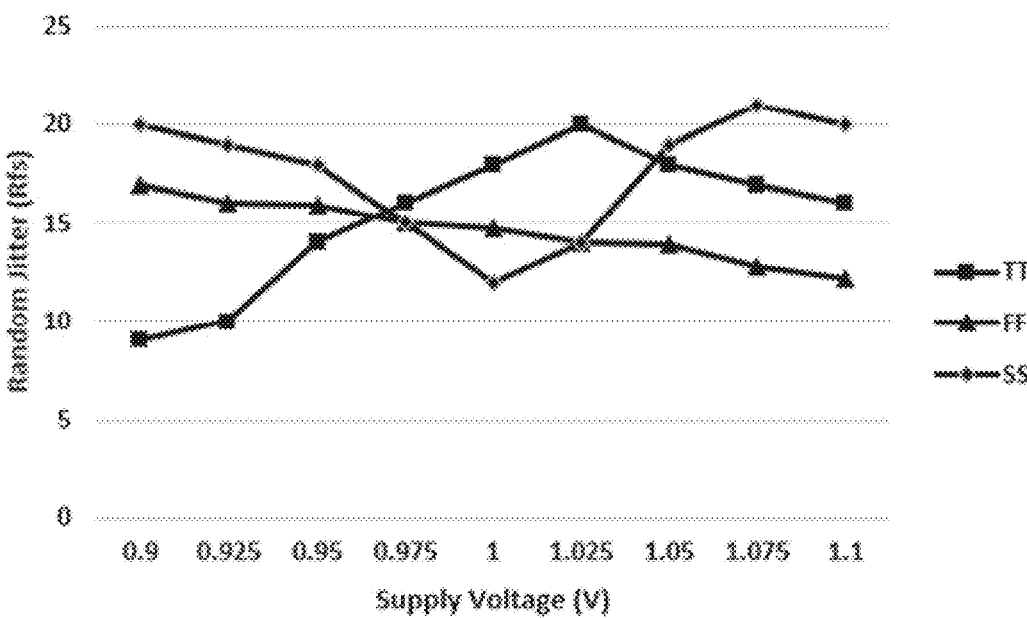
FIG. 7 depicts simulation results for random jitter for the PVT conditions used in FIG. 6.

FIG. 7 depicts simulation results for random jitter for the PVT conditions used in FIG. 6. It is noted that plot 700 considers various typical electrical components and sub-circuits that contribute to jitter (measured in femtoseconds), such as the VCO, clock generators, frequency dividers, etc. The experimental results in FIG. 7 confirm that the present embodiments, advantageously, exhibit relatively low jitter across the tested conditions.

Figure 8:
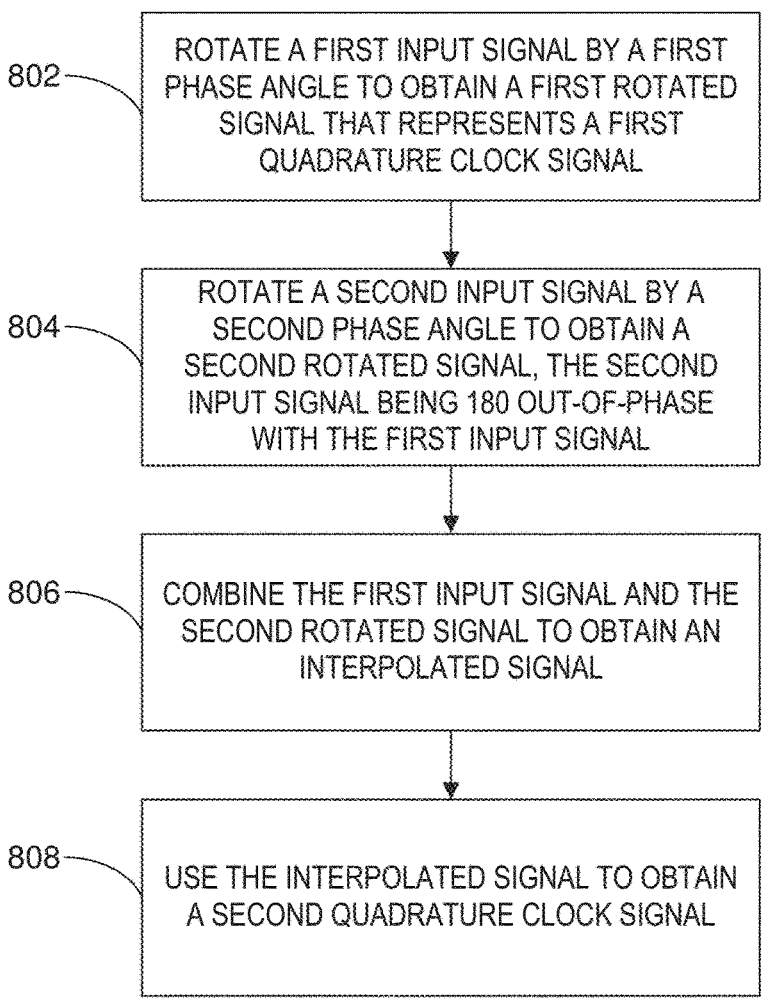
FIG. 8 is a flowchart for a quadrature generation process in accordance with various embodiments of the present disclosure.

FIG. 8 is a flowchart for a quadrature generation process in accordance with various embodiments of the present disclosure. In embodiments, process 800 may begin at step 802 when a first input signal may be rotated by a first phase angle to obtain a first rotated signal that represents a first quadrature clock signal. At step 804, a second input signal may be rotated by a second phase angle to obtain a second rotated signal. In embodiments, the second input signal is 180 degrees out-of-phase with the first input signal. At step 806, the first input signal and the second rotated signal may be combined to obtain an interpolated signal. Finally, at step 808, the interpolated signal may be used to obtain a second quadrature clock signal. One skilled in the art will recognize that: (1) certain steps may optionally be performed; (2) steps may not be limited to the specific order set forth herein; (3) certain steps may be performed in different orders; and (4) certain steps may be done concurrently.

One skilled in the art will further recognize that no computing system or programming language is critical to the practice of the present invention. It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A quadrature clock generation method comprising:

rotating a first input signal by a first phase angle to obtain a first rotated signal that represents a first quadrature clock signal;

rotating a second input signal by a second phase angle to obtain a second rotated signal, the second input signal being 180 degrees out-of-phase with the first input signal;

combining the first input signal and the second rotated signal to obtain an interpolated signal using an interpolation circuit;

using the interpolated signal to obtain a second quadrature clock signal;

wherein obtaining the first rotated signal comprises using a first set of inverters to generate the first quadrature clock signal;

wherein obtaining the second quadrature clock signal comprises using a second set of inverters comprising the interpolation circuit; and wherein the method comprises using a third set of inverters to match a delay caused by the second set of inverters.

2. The quadrature clock generation method according to claim 1, wherein at least one of the first or second input signals is generated by a voltage-controlled oscillator circuit.

3. The quadrature clock generation method according to claim 1, wherein the first phase angle is between 45 degrees and 135 degrees inclusive.

4. The quadrature clock generation method according to claim 1, wherein at least one of the first and second set of inverters are cascaded.

5. The quadrature clock generation method according to claim 1, wherein the first input signal is delayed by one-fourth of a clock period.

6. The quadrature clock generation method according to claim 1, further comprising using one or more dummy inverters to equalize a fanout.

7. A quadrature clock generation circuit comprising:

a first inverter circuit configured to receive a first input signal and, in response to receiving the first input signal, to rotate the first input signal by a first phase angle to obtain a first rotated signal, which first rotated signal represents a first quadrature clock signal;

a second inverter circuit configured to receive a second input signal and, in response to receiving the second input signal, to rotate the second input signal by a second phase angle to obtain a second rotated signal, the second input signal being 180 degrees out-of-phase with the first input signal;

an interpolation circuit that combines the first input signal with the second rotated signal to obtain a second quadrature clock signal; and a third inverter circuit configured to match a delay caused by the interpolation circuit.

8. The quadrature clock generation circuit according to claim 7, wherein the interpolation circuit comprises an averaging circuit configured to average the first input signal and the second rotated signal.

9. The quadrature clock generation circuit according to claim 8, wherein the averaging circuit is implemented with CMOS technology.

10. The quadrature clock generation circuit according to claim 7 further comprising a voltage-controlled oscillator (VCO) circuit, wherein at least one of the first or second input signals is configured to be generated by the VCO circuit.

11. The quadrature clock generation circuit according to claim 10, wherein the VCO circuit is an LC VCO circuit.

12. The quadrature clock generation circuit according to claim 7, further comprising a buffer configured to balance a load of at least one of the first inverter circuit or the second inverter circuit.

13. The quadrature clock generation circuit according to claim 7, wherein at least one of the first inverter circuit or the second inverter circuit comprises at least one dummy inverter to equalize fanouts.

14. The quadrature clock generation circuit according to claim 7, wherein the first inverter circuit or the second inverter circuit are cascaded.

15. The quadrature clock generation circuit according to claim 7, wherein the first phase angle is between 45 degrees and 135 degrees inclusive.

16. The quadrature clock generation circuit according to claim 7, wherein the first and second input signals comprise at least one of a sinusoidal waveform or a rectangular waveform.

* * * * *